United States Patent
Karsch (10) Patent No.: US 11,040,613 B2
(45) Date of Patent: Jun. 22, 2021

(54) METHOD FOR PRODUCING A LIQUID CONTAINER, LIQUID CONTAINER FOR A MOTOR VEHICLE AND INJECTION MOLDING TOOL

(71) Applicant: KAUTEX TEXTRON GmbH & CO. KG, Bonn (DE)

(72) Inventor: Ulrich Karsch, Niederkassel (DE)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 201 days.

(21) Appl. No.: 16/321,779

(22) PCT Filed: Nov. 28, 2016

(86) PCT No.: PCT/EP2016/079030
§ 371 (c)(1),
(2) Date: Jan. 31, 2019

(87) PCT Pub. No.: WO2018/019396
PCT Pub. Date: Feb. 1, 2018

(65) Prior Publication Data
US 2020/0376953 A1 Dec. 3, 2020

(30) Foreign Application Priority Data
Jul. 29, 2016 (DE) .......................... 102016214059.0

(51) Int. Cl.
| B29C 45/16 | (2006.01) |
| B60K 15/03 | (2006.01) |
| B29C 45/26 | (2006.01) |
| B29L 31/00 | (2006.01) |

(52) U.S. Cl.
CPC ...... *B60K 15/03177* (2013.01); *B29C 45/164* (2013.01); *B29C 45/1642* (2013.01); *B29C 45/2669* (2013.01); *B29C 2045/2671* (2013.01); *B29L 2031/7172* (2013.01); *B60K 2015/03046* (2013.01); *B60K 2015/03493* (2013.01)

(58) Field of Classification Search
None
See application file for complete search history.

(56) References Cited

U.S. PATENT DOCUMENTS

| 2011/0180973 A1 | 7/2011 | Mao |
| 2015/0102026 A1 | 4/2015 | Parola et al. |

FOREIGN PATENT DOCUMENTS

| CN | 101746012 A | 6/2010 |
| CN | 102729405 A | 10/2012 |
| CN | 103124626 A | 5/2013 |
| DE | 102009052471 A1 | 5/2010 |
| DE | 102010034919 A1 | 7/2011 |

(Continued)

OTHER PUBLICATIONS

Internatonal Preliminary Report on Patentability dated Oct. 5, 2018 From PCT/ EP2016/079030, Filed Nov. 28, 2016 with English Translation and untranslated versions, along with english translation of amended claims.

(Continued)

*Primary Examiner* — Monica A Huson
(74) *Attorney, Agent, or Firm* — Wiley Rein LLP (57) ABSTRACT

The invention relates to a method for producing a liquid con-tainer (2) for a motor vehicle, which is assembled from at least two shells (4, 6). Furthermore, the invention relates to a liquid container (2) for a motor vehicle.

17 Claims, 8 Drawing Sheets

(56) References Cited

FOREIGN PATENT DOCUMENTS

| DE | 102010046378 B4 | 7/2015 |
| JP | H10 52834 A | 2/1998 |
| JP | 2004-98511 A | 4/2004 |
| WO | WO 2011/020582 A1 | 2/2011 |
| WO | 2012/038018 A1 | 3/2012 |

OTHER PUBLICATIONS

International Search Report dated Mar. 24, 2017 Issued in PCT/EP2016/079030, filed on Nov. 28, 2016 (English translation).
Written Opinion From PCT/EP2016/079030, Filed on Nov. 28, 2016 (Untranslated).
"Office Action received for Chinese Patent Application No. 201680089610.0, dated Jul. 31, 2020", 7 pages.

METHOD FOR PRODUCING A LIQUID CONTAINER, LIQUID CONTAINER FOR A MOTOR VEHICLE AND INJECTION MOLDING TOOL

RELATED APPLICATIONS

This Application is a § 371 National Stage Application of PCT/EP2016/079030, filed Nov. 28, 2016, which claims priority benefit of German Patent Application No. 102016214059.0, filed Jul. 29, 2016, which applications are incorporated entirely by reference herein for all purposes.

FIELD

The invention relates to a method for producing a liquid container for a motor vehicle, to a liquid container for a motor vehicle, and to an injection molding tool.

BACKGROUND ART

In modern motor vehicles, a multiplicity of different operating liquids are stored in liquid containers or tanks. These may for example be fuel, engine oil, urea solution for selective catalytic reduction or cleaning liquid for the glazing of the headlamps or of the passenger compartment.

To keep the environmental burden caused by motor vehicles low, there is a demand for substances which place a burden on the environment, such as for example fuel for the propulsion of the vehicle, to be reliably accommodated and encapsulated in a liquid container. In particular for lightweight fuel tanks for storing fuel, it is necessary to keep the diffusion-based emissions via the plastics wall of the tank low. For this purpose, the plastics walls of such tanks are of multi-layer construction and have a barrier layer which serves as a diffusion barrier for the stored fuel.

These multi-layer plastics walls with a barrier layer are commonly firstly coextruded as mat-like or hose-like semi-finished products in a coextrusion blow molding process, and subsequently brought into the intended shape by blow molding. By means of the coextrusion in hose-like or mat-like form, it is ensured that the barrier layer extends fully areally over the entire tank wall. Aside from a filling opening of the tank, it is thus the case that the entire cavity volume for storing fuel is enclosed or surrounded by the barrier layer.

By virtue of the fact that, during the coextrusion blow molding process, the extrusion of the semifinished product and the actual molding process, specifically the internal pressurization of the semifinished product in a blow molding tool, take place in two separate working steps, the blow molding process is relatively time-consuming and expensive. By contrast, the injection molding process basically offers the advantage that the intermediate step of extruding the semifinished part can be omitted by virtue of the plasticized plastic being injected directly into a cavity of an injection molding tool.

In the injection molding of multi-layer components having two or more plastics components, there is however the disadvantage that inhomogeneities can arise in the layer thickness and in the layer propagation. In particular in edge regions spaced apart from a gate, incomplete layer formation may arise owing to irregularities in the flow front profile and in the flow path lengths of one or more plastics components, such that fully areal layer formation, for example of a barrier layer, cannot be ensured. Therefore, multi-layer walls of fuel tanks are commonly not manufactured in an injection molding process.

SUMMARY OF THE INVENTION

Against this background, the present invention is based on the technical problem of specifying a method for producing a liquid container for a motor vehicle which does not have the disadvantages described above, or has said disadvantages at least to a reduced extent, and in particular permits fully areal formation of a barrier layer. Furthermore, it is sought to specify a liquid container for a motor vehicle and an injection molding tool.

The above-described technical problem is solved by means of a method as claimed in claim 1, a liquid container as claimed in claim 14 and an injection molding tool as claimed in claim 16. Further refinements of the invention will emerge from the dependent claims and from the description that follows.

The invention relates to a method for producing a liquid container for a motor vehicle, which liquid container is assembled from at least two shells, wherein the following method steps are performed:

providing an injection molding machine,
having an injection molding tool,
wherein the injection molding tool has at least one mold cavity which is provided for replicating the geometry of a first shell of the liquid container and which is formed between mold walls of at least one first and one second mold half of the injection molding tool,
wherein the injection molding tool has at least one auxiliary cavity,
wherein the auxiliary cavity is fluidically connected to the mold cavity,
wherein the auxiliary cavity adjoins the mold cavity at least in certain portions in an edge region, spaced apart from a gate region, of the mold cavity, and
wherein the auxiliary cavity is provided for receiving excess injection molding material;
producing the first shell by plasticizing and injecting a first plastics component and a second plastics component into the mold cavity,
such that the first and the second plastics component are connected to one another along an interface and that
the first plastics component lies against a mold wall of the first mold half, and the second plastics component and the interface are spaced apart from the mold wall of the first mold half,
wherein at least a part of the auxiliary cavity is filled with excess injection molding material of the first and second plastics component;
producing a second shell of the liquid container;
connecting the first and second shell;
removing the excess material of the first and second plastics component, wherein the removal of the excess material is performed before or after the connection of the shells.

By virtue of the fact that both the first and the second plastics component extend into the auxiliary cavity during the production of the first shell, a structure of the liquid container with two or more layers can be reliably realized even in the edge region of the mold cavity.

The injection molding material of the first and second plastics component that is received in the auxiliary cavity (excess injection molding material) is not part of the intended final geometry of the liquid container and is therefore removed. The auxiliary cavity thus serves, during the injection molding process, as an overflow or run-out zone for the flow fronts of the plastics components, such that any inhomogeneities in the layer formation can be displaced into a region, the auxiliary cavity, which is spaced apart from the component geometry itself.

The removal of the excess injection molding material may be performed for example by separation, cutting (for example by laser or water jet), punching, sawing or milling. The removed material may be supplied for recycling.

In the present case, where "interfaces" are referred to, these are regions in which the plastics components adhere to one another. The interfaces may be formed whilst the plastics components are in the fluid molten state, in order to realize a high strength of the layered composite. Here, interlooping may occur between the plastics, which promotes good layer adhesion.

The liquid container may be assembled from exactly two shells, which in this case are referred to as half-shells. By virtue of the fact that only two half-shells are connected to form a liquid container, the number of joining points can be kept low.

It is self-evident that functional units such as pumps, fill level sensors, valves and the like may be installed within the shells or half-shells prior to the connection thereof.

The second shell may be produced in the mold cavity of the first shell after the first shell has been removed from the mold cavity. It is thus expediently possible for two shells for a liquid container to be produced using one tool with a single mold cavity.

The second shell may be produced in a mold cavity which is separate from the mold cavity of the first shell. It is thus possible for a geometry which differs from the first shell to be provided for the second shell.

The mold cavity of the second shell may be provided in a separate injection molding tool. In this way, the manufacture of the first shell can be performed independently of the manufacture of the second shell.

The mold cavity of the second shell, which is separate from the mold cavity of the first shell, may be provided in the same injection molding tool in which the mold cavity of the first shell is also provided. Consequently, both the first shell and the second shell can be produced simultaneously in one injection molding tool.

The injection molding tool may have two or more mold cavities for producing first shells and second shells. For example, four cavities may be provided in an injection molding tool, wherein two mold cavities for producing first shells are provided and two further mold cavities for producing second shells are provided. In this way, shells for two liquid containers can be manufactured simultaneously in a single injection molding cycle.

Each mold cavity may be assigned one or more injection molding nozzles for injecting the plastics components.

If the second shell is produced in a mold cavity separate from the mold cavity of the first shell, the mold cavity of the second shell likewise has an auxiliary cavity which is provided for receiving excess injection molding material.

If the mold cavity of the first shell and the mold cavity of the second shell, which is separate from the mold cavity of the first shell, are provided in one injection molding tool, the auxiliary cavities thereof may be at least partially fluidically connected to one another, such that the first shell and the second shell are, after the injection molding process, initially cohesively connected to one another by way of the excess injection molding material to be removed. In this way, the manual or automated removal of the shells by means of a removal tool can be simplified.

In a further refinement of the method, provision is made whereby the provided injection molding machine is configured for multi-component sandwich injection molding, wherein the first and second plastics component are introduced in the multi-component sandwich injection molding process into the mold cavity and the auxiliary cavity, wherein the injection of the first plastics component into the mold cavity begins at a time before the injection of the second plastics component, and the second plastics component is injected as a core layer into the first plastics component, such that the first plastics component encloses the core layer.

If exactly two plastics components are processed, this is referred to as two-component sandwich injection molding. By means of two-component sandwich injection molding, it is possible in a simple manner to realize a wall structure which has three layers in cross section, wherein a core layer is enclosed at least on two sides by surface layers. Here, after a temporally offset start of the injection, during the further course of an injection cycle, the plastics are introduced simultaneously into the mold cavity and into the auxiliary cavity, such that this can be referred to as a sequential coinfection of the plastics components.

A follow-up pressure phase for the compensation of cooling-induced shrinkage may be realized by means of the second plastics component, which presses the first plastics component against the mold walls of the mold halves.

The first plastics component and the second plastics component may be introduced into the injection molding tool via a common feed orifice or gate. In order for the second plastics component to be completely enclosed by the first plastics component, the end of the injection of the second plastics component may occur at a time prior to the end of the injection of the first plastics component. In other words, in the region of the gate or feed orifice, material of the first plastics component may be "piled up" in order to seal off the second plastics component with respect to the surroundings in the region of the feed orifice. The gate or feed orifice may, in a known manner, be at least partially removed by finish machining, for example by milling.

The second plastics component may serve as a barrier layer or diffusion barrier for a fuel.

The connection of the first and second shells may be realized by welding. By means of an additional deformation process, the second plastics component of the first shell may be connected to a second plastics component of the second shell in order to form a continuous, fully areal barrier layer.

According to a further refinement, provision is made whereby at least three plastics components are injected one into the other in the multi-component sandwich injection molding process, in particular a surface layer, an adhesion promoter and a core layer. It is thus possible to realize a five-layer structure of the first shell. It is self-evident that the second shell may likewise analogously be constructed with three, five or more layers.

If the surface layer and the core layer are formed from materials which are chemically and/or physically not compatible such that adhesion can be ensured in the region of the interfaces, the adhesion promoter serves as an intermediate layer for forming a layered composite. Here, the adhesion promoter forms an adhesive connection both to the surface layer and to the core layer.

In a further refinement of the injection molding process, provision is made whereby a mold half is assembled in at least two parts from a main body and a mold insert, wherein, in particular, the mold wall of the mold cavity is assigned to the main body and an auxiliary wall of the auxiliary cavity is assigned to the mold insert. The mold insert may be manufactured and provided independently of the main body. The auxiliary cavity may be retroactively optimized independently of the main body.

According to a further refinement of the method, provision is made whereby the mold cavity is, as viewed in a cross section, circumferentially completely enclosed by the auxiliary cavity. A fully areal extent of the second plastics component of the first shell can thus be promoted.

The first plastics component may, during the injection into the mold cavity, have a lower viscosity than the second plastics component. Reliable filling of the mold cavity and of the auxiliary cavity can thus be realized.

According to a further refinement of the method, the first plastics component is a polyamide (PA), a polyphenylene sulfide (PPS), a polyoxymethylene (POM) or a polyphthalamide (PPA), and the second plastics component is a polyphthalamide (PPA), a polyamide (PA), a polyoxymethylene (POM), a polyphenylene sulfide (PPS), liquid-crystal polymer (LCP), polyketone (PK) or an ethylene vinyl alcohol copolymer (EVOH).

A plastics component may be a fiber-reinforced plastic. It is thus for example possible for a granulate to be provided which has fiber contents of 10 to 60 percent by weight inclusive, in particular fiber contents of 20 to 40 percent by weight inclusive. The fibers may be short fibers with a length of less than or equal to 12 mm, or long fibers with a length of greater than or equal to 12 mm, in particular a length of 12 mm to 25 mm inclusive. The fibers may be contained in a granulate provided for being plasticized, or may be admixed to an already plasticized plastic. By means of the fiber reinforcement, a robust and dimensionally stable liquid container can be produced.

According to a further refinement of the method, in the case of a five-layer wall structure, the first plastics component is a high-density polyethylene (HDPE), the second plastics component is an adhesion promoter, and the third plastics component is an ethylene vinyl alcohol copolymer (EVOH).

The first plastics component may, during the injection into the mold cavity, have a lower viscosity than the second plastics component.

The third plastics component may have substantially the viscosity of the second plastics component, wherein "substantially equal" means that there may be a deviation in the viscosity of the third plastics component in relation to the second plastics component in a range of +/−15%, in particular +/−5%.

Where "viscosity" is referred to here, this is the dynamic viscosity of the plastics components, which changes with the temperature of the plastics components.

Before or after the connection of the shells, one or more functional units such as one or more pumps, fill level sensors, valves, connector plates, connection elements or the like are fastened to the first shell and/or to the second shell. It is thus possible for functional units to be integrated into the liquid container in a simple manner.

According to a further refinement of the method, the injection molding tool has a throttle which is provided for regulating a melt flow from the mold cavity to the auxiliary cavity. By means of the mixture of first and second plastics which is also present in the auxiliary cavity, the excess material can only be fed to a "downcycling" process. The throttle serves in particular for keeping the amount of first and second plastics that passes into the auxiliary cavity as small as possible in order to save material costs. In other words, the throttle makes it possible to reduce the size of a required auxiliary chamber volume. The throttle is therefore in particular a throttle which can be used with melts.

The throttle may be provided in a simple and inexpensive manner by virtue of the throttle being formed by a constriction of a mold cross section.

The throttle may therefore be a constriction or narrowing which circumferentially partially encloses, in particular fully encloses, the mold cavity. Therefore, during the injection of the plastic, the throttle is firstly filled at least in certain portions before the plastic passes over into the auxiliary cavity.

The constriction or narrowing may be arranged at least in certain portions, in particular entirely, between the mold cavity and the auxiliary cavity, such that a fluidic connection is produced by means of the throttle between the mold cavity and the auxiliary cavity in the region of the throttle. Proceeding from a gate, a plastic therefore passes initially into the mold cavity and, after passing through the throttle, into the auxiliary cavity.

It is self-evident that such a narrowing or constriction between the mold cavity and the auxiliary cavity may also be provided only in certain portions. Depending on component geometry and the flow front profile of the plastics during the injection molding process, the arrangement of a throttle or local throttle regions between the mold cavity and the auxiliary cavity may be adapted so as to realize, in particular, a fully areal form of a wall structure with two, three or more layers, with the least possible amount of excess material in the region of the auxiliary cavity.

With impingement upon a throttle which can be used with melts, in the case of a coinfection, the material flow of a second material which is more viscous, that is to say of higher viscosity, than the first material in the direction of the auxiliary cavity can for example be reduced. This promotes a propagation of second material through adjacent regions of first material, or the realization of a fully areal layer formation with second material in the mold cavity.

The throttle may locally fully interrupt a fluidic connection between the mold cavity and the auxiliary cavity. The throttle may thus have web or wall segments which are provided between the mold cavity and the auxiliary cavity.

In a further refinement of the method, a method is specified wherein mold slides are provided for opening up and closing off the auxiliary cavity, having the method steps:

partially or completely closing off the fluidic connection between the mold cavity and the auxiliary cavity by means of the mold slides, in particular before the injection of the first plastics component and/or of the second plastics component;

partially or completely opening up the fluidic connection between the mold cavity and the auxiliary cavity, in particular after the injection of the first plastics component and/or of the second plastics component.

The mold slides may therefore be provided as throttles for regulating a melt flow between the mold cavity and the auxiliary cavity.

The mold slides may form a variable throttle between the mold cavity and the auxiliary cavity.

For example, the mold slides may, at the time of the injection of the first plastics component, be fully or partially closed in order to partially or fully interrupt a fluidic connection between the mold cavity and the auxiliary cavity. After or at the time of the injection of the second plastics component, the mold slides may be fully or partially opened in order to partially or fully open a fluidic connection between the mold cavity and the auxiliary cavity.

By means of the throttle, the material and energy use in the injection molding process can be reduced. By means of a possible reduction of a volume of the auxiliary cavity, the size of the tool itself, of the clamping plates for the tool and the required closing force of the injection molding machine can be reduced. Altogether, the production costs can be lowered in this way.

According to a further aspect, the invention relates to a liquid container for a motor vehicle, wherein the liquid container has been produced by means of the method according to the invention. It is thus possible in an inexpensive manner to produce a liquid container whose shells have a structure with two or more layers as far as into the edge regions, such that a barrier layer can be formed.

According to a further refinement of the liquid container, provision is made whereby the liquid container has an at least three-layer wall structure, wherein a barrier layer is, at least in certain portions, enclosed at least on two sides by surface layers, and wherein the barrier layer is in particular formed fully areally in the wall structure. The barrier layer may be a diffusion barrier in order to enable fuel to be stored with low diffusion-based emissions.

For example, the barrier layer may be a PPA layer or an EVOH layer, wherein an EVOH layer forms a barrier layer for hydrocarbons and oxygen.

The layer structure may locally have more than three layers, in particular by means of alternate welding, adhesive bonding and/or penetration of the layers in connecting or joining regions formed between the shells. In particular, additional adhesives or sealants may be introduced into the joining regions.

The wall structure may have five or more layers, in particular through the use of an adhesion promoter as already discussed above, or the incorporation of additional barrier layers or surface layers.

The wall thickness of a shell of the liquid container may amount to 3 mm+/−1 mm. It is thus possible to produce a particularly lightweight liquid container with little material usage. Here, the wall thickness refers in particular to the wall thickness of a shell prior to the connection to a further shell. It is self-evident that the wall thickness of the liquid container in a connection region in which the shells of the liquid container bear against one another may be defined by the sum of the wall thicknesses of the shells bearing against one another. Thus, the wall thickness of the liquid container may likewise amount to substantially 3 mm+/−1 mm, but may be locally thickened to approximately 6 mm in a connection region in which two shells are connected to one another.

According to a final aspect, the invention relates to an injection molding tool for producing a liquid container for a motor vehicle, having at least one mold cavity which is provided for replicating the geometry of a first shell and/or of a second shell of the liquid container and which is formed between mold walls of at least one first and one second mold half of the injection molding tool, wherein the injection molding tool has at least one auxiliary cavity, wherein the auxiliary cavity is fluidically connected to the mold cavity, wherein the auxiliary cavity adjoins the mold cavity at least in certain portions in an edge region, spaced apart from a gate region, of the mold cavity, and wherein the auxiliary cavity is provided for receiving excess injection molding material.

As already discussed in the introduction, the design of the injection molding tool permits an in particular fully areal form of a wall structure of the liquid container with two, three or more layers.

According to a further refinement, the injection molding tool has a throttle which is provided for regulating a melt flow from the mold cavity to the auxiliary cavity. The throttle makes it possible for a required auxiliary chamber volume to be reduced. The throttle is therefore in particular a throttle which can be used with melts.

The throttle may be provided in a simple and inexpensive manner by virtue of the throttle being formed by a constriction of a mold cross section.

The throttle may therefore be a constriction or narrowing which circumferentially partially encloses, in particular fully encloses, the mold cavity. Therefore, during the injection of the plastic, the throttle is firstly filled at least in certain portions before the plastic passes over into the auxiliary cavity.

The constriction or narrowing may be arranged at least in certain portions, in particular entirely, between the mold cavity and the auxiliary cavity, such that a fluidic connection is produced by means of the throttle between the mold cavity and the auxiliary cavity in the region of the throttle. Proceeding from a gate, a plastic therefore passes initially into the mold cavity and, after passing through the throttle, into the auxiliary cavity.

It is self-evident that such a narrowing or constriction between the mold cavity and the auxiliary cavity may also be provided only in certain portions. Depending on component geometry and the flow front profile during the injection molding process, the arrangement of a fully encircling throttle or a plurality of local throttle regions between the mold cavity and the auxiliary cavity may be adapted so as to promote, in particular, a fully areal form of a wall structure with two, three or more layers, with the least possible amount of excess material in the region of the auxiliary cavity.

With impingement upon a throttle which can be used with melts, in the case of a coinfection, the material flow of a second material which is more viscous, that is to say of higher viscosity, than the first material in the direction of the auxiliary cavity can for example be reduced. This promotes a propagation of second material through adjacent regions of first material, or the realization of fully areal layer formation with second material in the mold cavity.

The throttle may be segmented for the purposes of locally regulating the melt flow. In one or more subregions, the mold cavity may therefore transition directly, and without an interposed throttle, into the auxiliary cavity. In one or more further subregions, the throttle may be provided between the mold cavity and the auxiliary cavity. Thus, as seen in a plan view of a mold half, the throttle may for example be arranged between the mold cavity and the auxiliary cavity along two longitudinal sides of a mold cavity, whereas no throttle is arranged between the mold cavity and the auxiliary cavity along two transverse sides of the mold cavity.

The throttle may, as viewed in a cross section or a plan view, completely enclose the mold cavity. Regulation of the melt flow, in particular local regulation of the melt flow, may in this case be realized by virtue of the throttle forming, in certain portions, a lesser or greater resistance to the melt flow. This may be realized for example by means of a throttle cross section which is adapted in certain portions.

The throttle may be configured to locally fully interrupt a fluidic connection between the mold cavity and the auxiliary cavity. The throttle may thus have web or wall segments which are provided between the cavity and the auxiliary cavity.

According to a further refinement, an injection molding tool is specified, wherein mold slides are provided for opening up and closing off the auxiliary cavity.

The mold slides may therefore serve as throttles for regulating a melt flow between the mold cavity and the auxiliary cavity.

The mold slides may be designed as variable throttles between the mold cavity and the auxiliary cavity.

For example, the mold slides may, at the time of the injection of the first plastics component, be fully or partially closed in order to partially or fully interrupt a fluidic connection between the mold cavity and the auxiliary cavity. After or at the time of the injection of the second plastics component, the mold slides may be fully or partially opened in order to partially or fully open a fluidic connection between the mold cavity and the auxiliary cavity.

The mold slides may be adjustable in continuously variable fashion between two end positions, in particular an open position and a closed position.

By means of the throttle, the material and energy use in the injection molding process can be reduced. By means of a possible reduction of a volume of the auxiliary cavity, the size of the tool itself, of the clamping plates for the tool and the required closing force of the injection molding machine can be reduced. Altogether, the production costs can be lowered in this way.

The mold slides may be arranged exclusively on the first mold half.

The mold slides may be arranged exclusively on the second mold half.

The mold slides may be arranged on the first mold half and on the second mold half.

First mold slides for the production of a first shell of the liquid container may be provided and arranged on the first mold half. Second mold slides for the production of a second shell of the liquid container may be provided and arranged on the first mold half.

It is self-evident that the injection molding tool may have one or more ventilation openings for ventilating the mold cavity and/or the auxiliary cavity during the injection molding process.

BRIEF DESCRIPTION OF THE DRAWINGS

The invention will be described in more detail below on the basis of a drawing, which illustrates exemplary embodiments. In the drawing, in each case schematically.

DETAILED DESCRIPTION OF THE EMBODIMENTS

Figure 1:
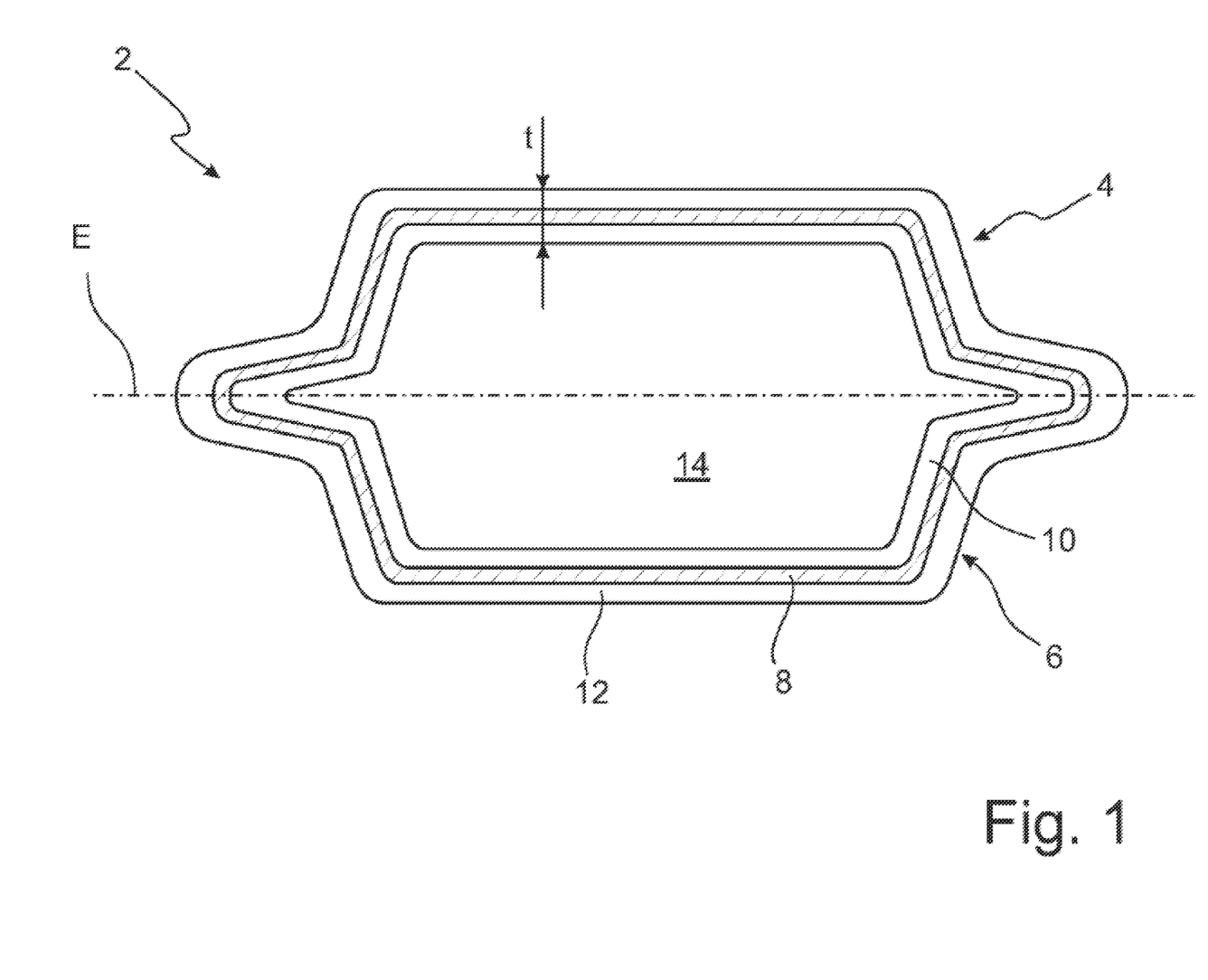
FIG. 1 shows a liquid container for a motor vehicle.

FIG. 1 shows a liquid container 2 for a motor vehicle (not illustrated), which in the present case is a fuel tank 2. The fuel tank 2 is assembled from two half-shells 4, 6, a first shell 4 and a second shell 6, which have been connected to one another in the region of a plane E.

The liquid container 2 has a three-layer wall structure. A barrier layer 8 is enclosed on two sides by an inner surface layer 10 and an outer surface layer 12.

The barrier layer 8 is formed fully areally in the wall structure. In the cross section shown in FIG. 1, a cavity volume 14 provided for storing fuel is fully surrounded by the barrier layer 8. The barrier layer 8 constitutes a diffusion barrier in order to minimize diffusion-based emissions during the storage of the fuel.

A wall thickness t of the shells 4, 6 of the liquid container 2 amounts to 3 mm+/−1 mm.

The liquid container 2 has been produced by means of a method according to the invention, which will be discussed below.

Figure 2:
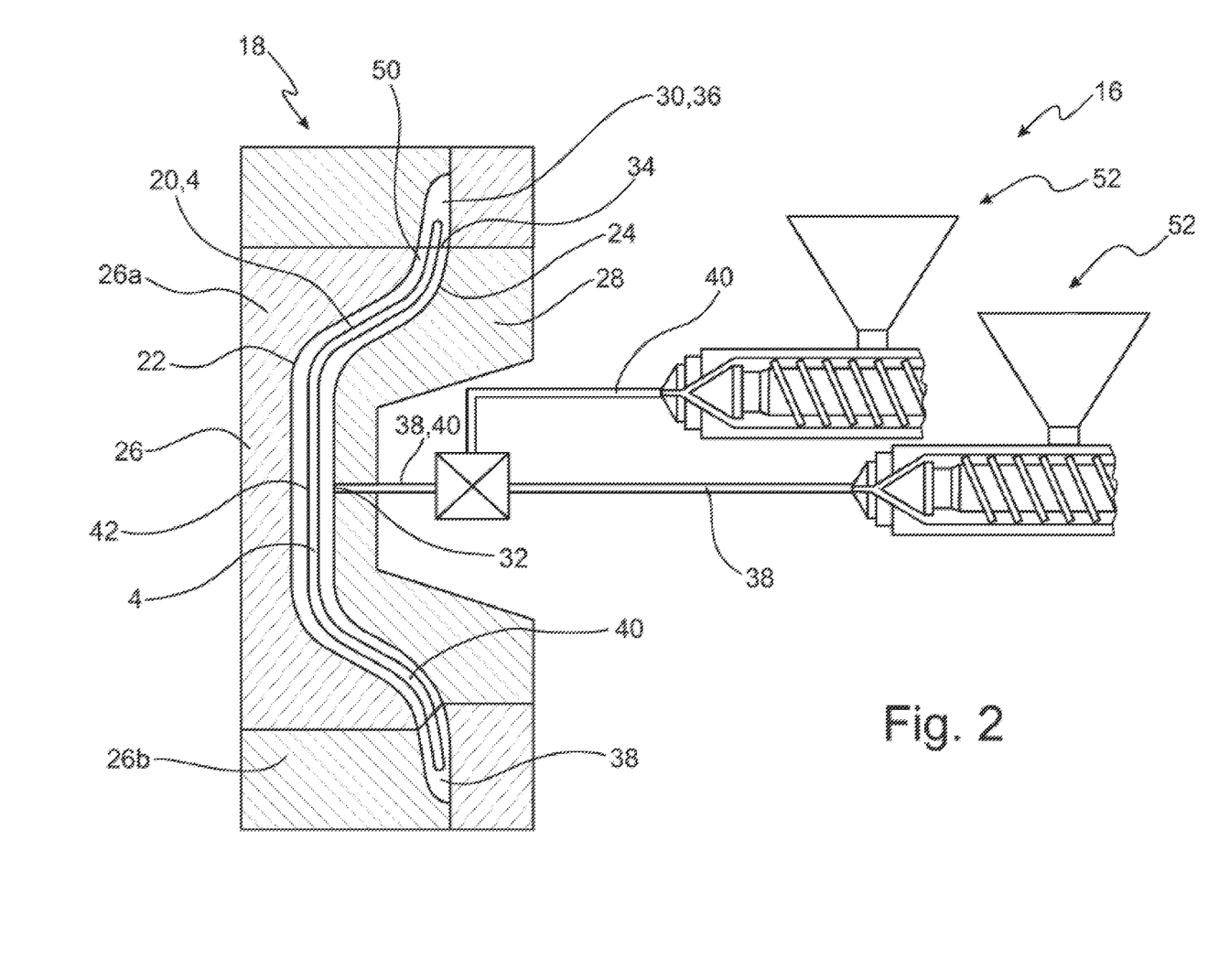
FIG. 2 shows an injection molding machine with an injection molding tool.

In a first step, an injection molding machine 16 is provided, which is configured for two-component sandwich injection molding.

The injection molding machine 16 has an injection molding tool 18. The injection molding tool 18 has at least one mold cavity 20 which is provided for replicating the geometry of the first shell 4 of the liquid container 2. In the present case, the shell 4 is received in the mold cavity 20. The mold cavity 20 is formed between mold walls 22, 24 of at least one first and one second mold half 26, 28 of the injection molding tool 18.

The injection molding tour 18 has an auxiliary cavity 30. The auxiliary cavity 30 is fluidically connected to the mold cavity 20. The auxiliary cavity 30 adjoins the mold cavity 20 at least in certain portions in an edge region 34, spaced apart from a gate region 32, of the mold cavity 20. The auxiliary cavity 30 is provided for receiving excess injection molding material 36. In the present case, the auxiliary cavity 30 has been filled with excess injection molding material 36.

The first shell 4 has been produced by plasticizing and injecting a first plastics component 38 and plasticizing and injecting a second plastics component 40 into the mold cavity 20.

The first and the second plastics component 38, 40 are connected to one another along an interface 42. The first plastics component 38 bears against the mold wall 22 of the first mold half 26 and against the mold wall 24 of the second mold half 28. The second plastics component 40 and the interface 42 are spaced apart from the mold walls 22, 24.

The auxiliary cavity 36 has been filled with excess injection molding material 36 of the first and second plastics component 38, 40.

The second shell 6 may be produced analogously.

After the removal from the respective mold, the first and second shell 4, 6 are connected to one another, such that a continuous barrier layer 8 is formed (FIG. 1). This may be realized by heating and compressing the layers.

The removal of the excess injection molding material 36 of the first and second plastics component 38, 40 is, in the present case, performed after the connection of the shells 4, 6 to form the liquid container 2. On the finished liquid container 2, the excess injection molding material 36 is no longer present (FIG. 1).

Figure 3:
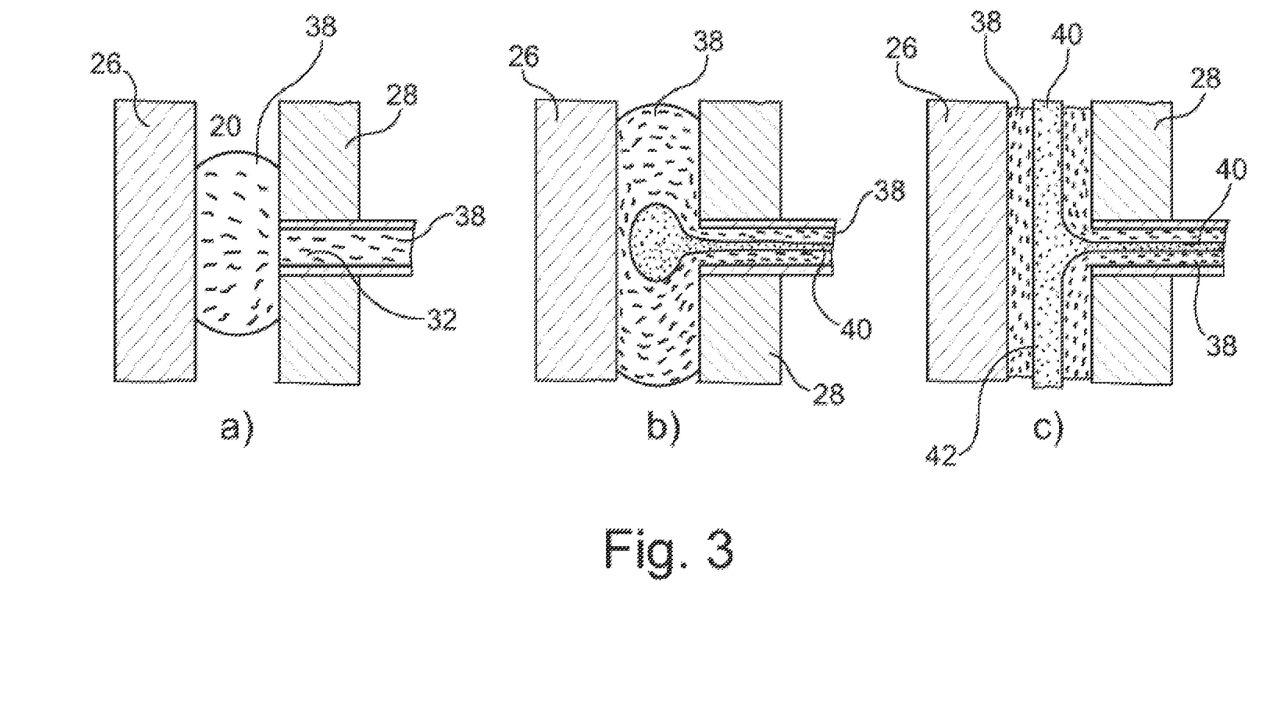
FIGS. 3a-3c show a two-component injection molding process as per FIG. 2.

To form the three-layer structure of the shell 4, the plastics components 38, 40 are injected one into the other sequentially. The first and second plastics component 38, 40 are introduced in a two-component sandwich injection molding process into the mold cavity 20 and into the auxiliary cavity 30 (FIG. 3). The injection of the first plastics component 38 into the mold cavity 20 (FIG. 3a) begins at a time prior to the injection of the second plastics component 40 (FIG. 3b). The second plastics component 40 is injected as a core layer into the first plastics component 38, such that the first plastics component 38 surrounds the core layer 40. The first plastics component 38 is a polyamide (PA) and the second plastics component 40 is a polyphthalamide (PPA).

A removal of the excess injection molding material 36 prior to the connection to a further shell results in three separate layers 8, 10, 12 on a shell 4, 6, wherein the layer 8 is in the present case produced from polyphthalamide (PPA), and the layers 10 and 12 are produced from polyamide (PA).

Figure 4:
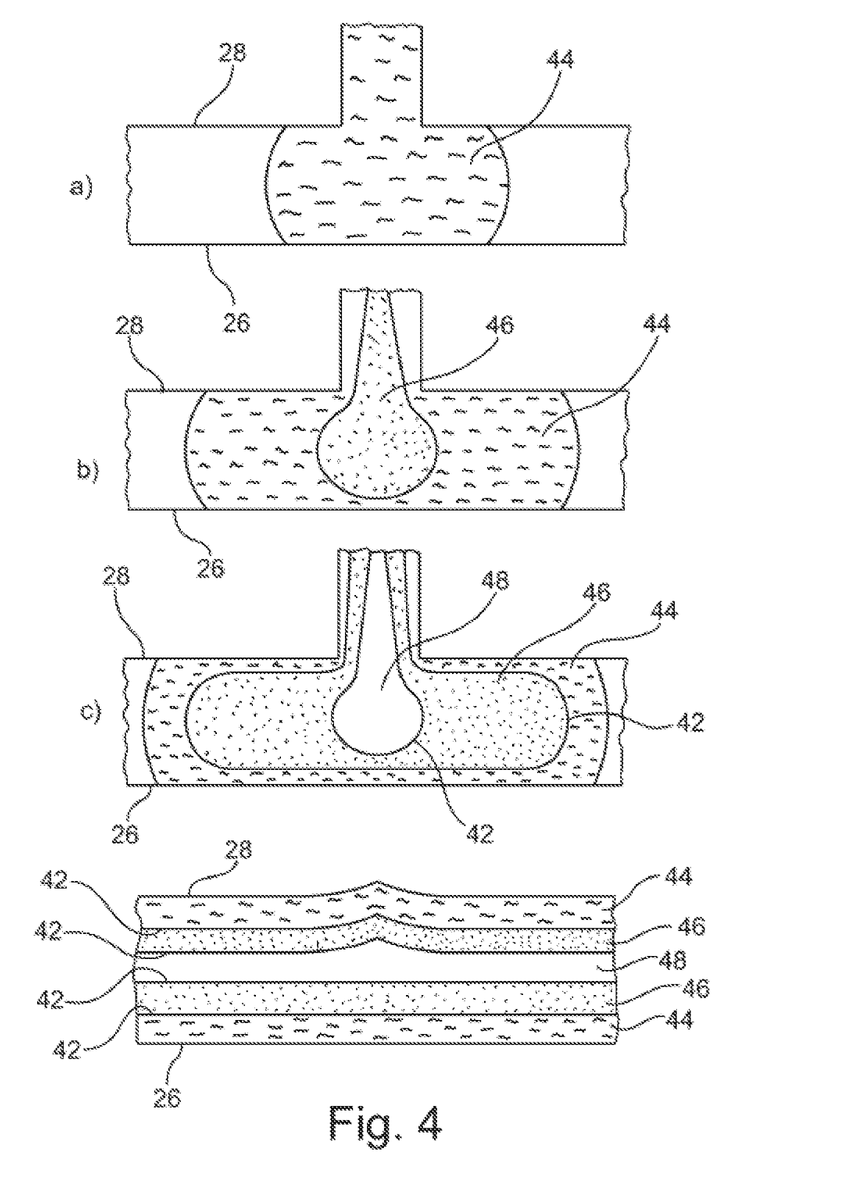
FIGS. 4a-4c show a multi-component injection molding process.

According to an alternative refinement of the method, at least three plastics components 44, 46, 48 are injected one into the other in the multi-component sandwich injection molding process, specifically a surface layer 44, an adhesion promoter 46 and a core layer 48 or barrier layer 48, resulting in a five-layer wall structure (FIG. 4).

The surface layer 44 is a high-density polyethylene (HDPE). The barrier layer is an ethylene vinyl alcohol copolymer (EVOH). The HDPE, during the injection into the mold cavity 20, has a lower viscosity than the adhesion promoter, wherein the EVOH has substantially the viscosity of the adhesion promoter.

The mold half 26 is assembled at least in two parts from a main body 26a and a mold insert 26b, wherein the mold wall 22 of the mold cavity 20 is assigned to the main body 26a and an auxiliary wall 50 of the auxiliary cavity 30 is assigned to the mold insert 26b. Likewise, the mold half 28 is assembled at least in two parts from a main body 28a and a mold insert 28b (FIG. 2, FIG. 5a).

Figure 5A:
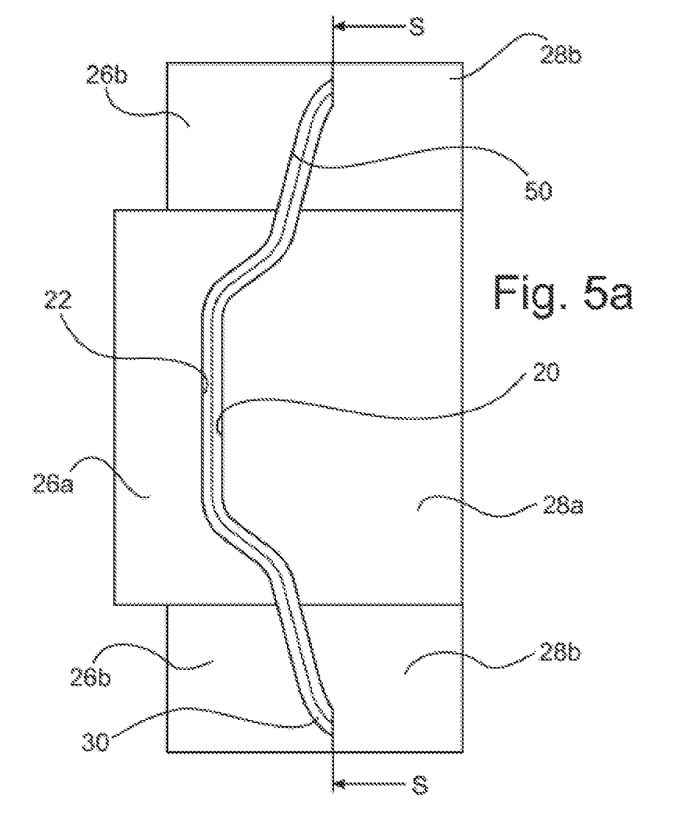
FIGS. 5a-5b show the injection molding tool from FIG. 2.
Figure 5B:
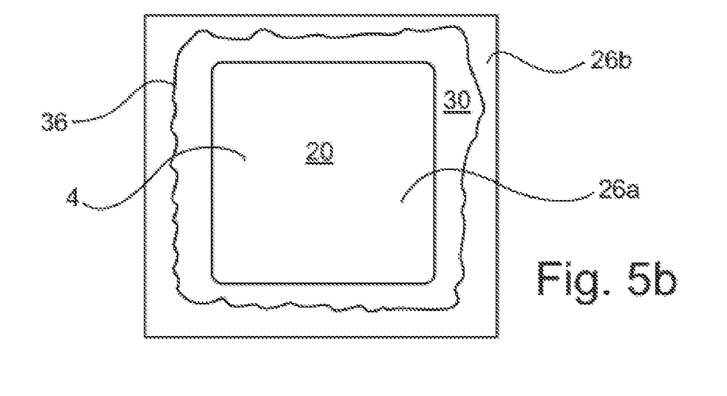

As viewed in a cross section along the section plane S, the mold cavity 20 is circumferentially completely enclosed by the auxiliary cavity 30 (FIG. 5a, FIG. 5a). In this way, it is possible to realize a homogeneous layer distribution within the first shell 4, wherein inhomogeneities in the layer propagation in the form of the excess injection molding material 36 are displaced into the auxiliary cavity 30 (FIG. 5b). The barrier layer 8 is therefore formed fully areally over the entire wall of the shell 4. The shell 6 may be produced analogously.

The first plastics component 38, during the injection into the mold cavity 20, has a lower viscosity than the second plastics component 40. The temperature of the plastics 38, 40 is in this case set in the region of a respective melting and conveying unit 52 of the injection molding machine 16 (FIG. 2).

Figure 6A:
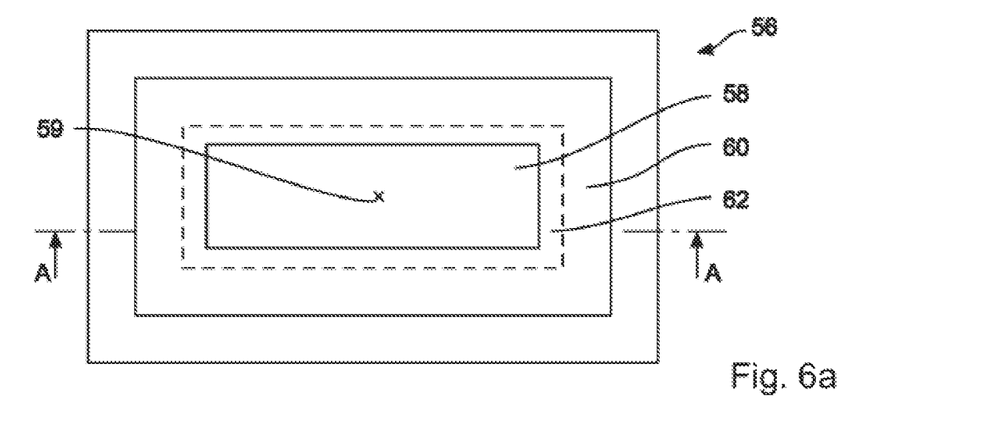
FIGS. 6a-6c show an injection molding tool with a throttle.

FIG. 6a schematically shows an injection molding tool 56 in a plan view. The injection molding tool 56 has a mold cavity 58. The injection molding tool 56 has an auxiliary cavity 60. The injection molding tool 56 has a throttle 62. The throttle 62 is provided for regulating a melt flow from the mold cavity 58 to the auxiliary cavity 60, wherein the melt is introduced into the mold cavity 58 via a gate 59.

Figure 6B:
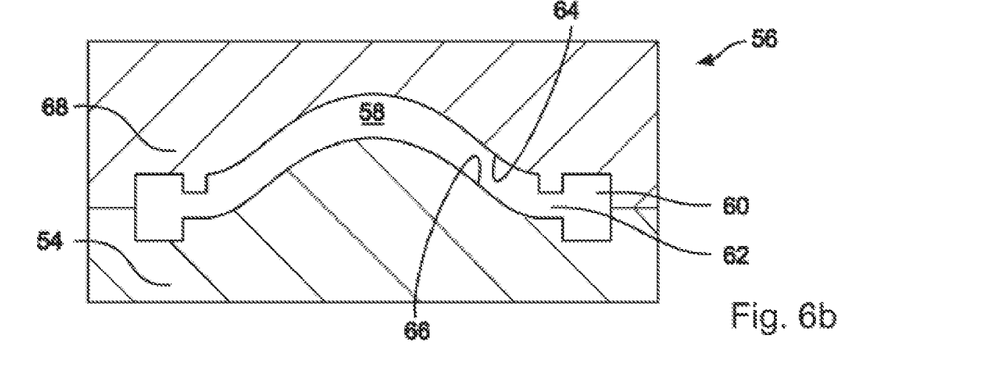

FIG. 6b shows a cross section of the injection molding tool 56 along a section line A-A, wherein both a first mold half 54 and a second mold half 68 of the injection molding tool 56 are illustrated in the section. In the example illustrated in FIG. 6b, the throttle 62 is incorporated integrally into the injection molding tool 56.

In the example according to FIG. 6b, the throttle 62 is formed as a local constriction adjoining the mold cavity 58. The throttle 62 constitutes a throttle which can be used with melts between mold cavity 58 and the auxiliary cavity 60. The spacing of the mold walls 64 and 66 facing toward one another is smaller in the region of the throttle 62 than in the region of the mold cavity 58 and in the region of the auxiliary cavity 60.

Figure 6C:
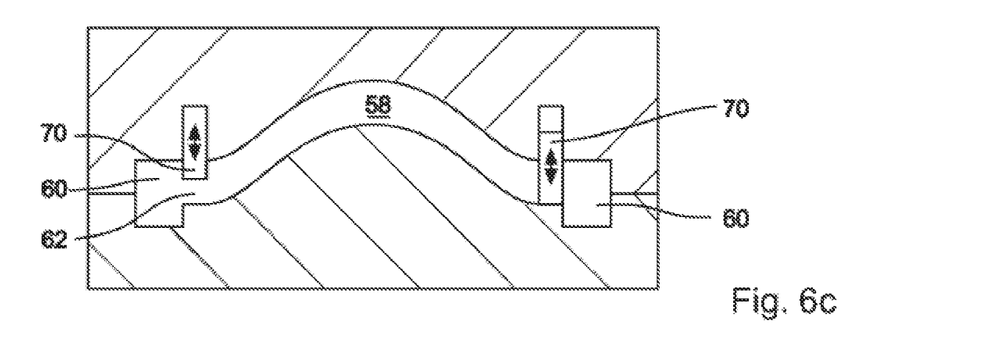
Figure 7A:
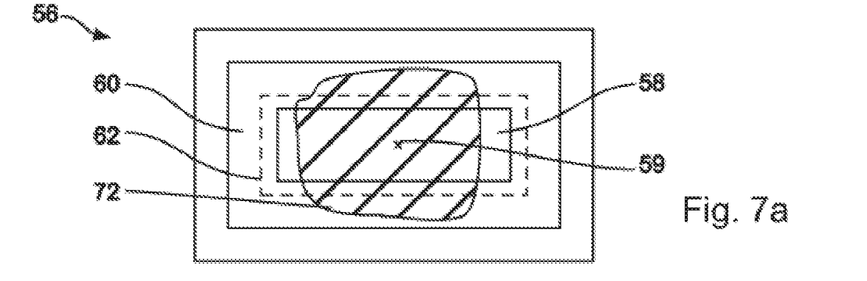
FIGS. 7a-7d show a filling process for an injection molding tool from FIG. 6.
Figure 7B:
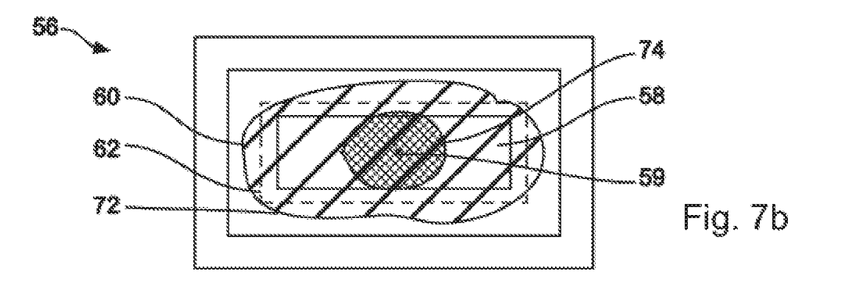
Figure 7C:
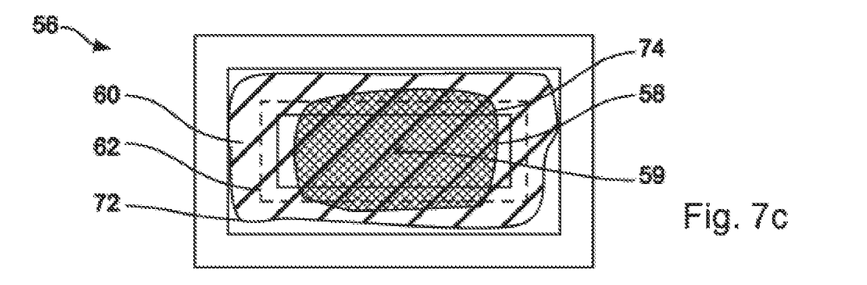
Figure 7D:
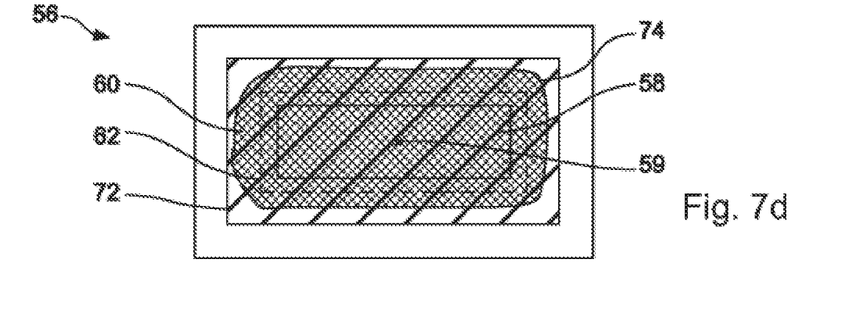

FIG. 6c shows a variant in which the throttle 62 is formed by means of mold slides 70 which are displaceable relative to the first mold half 54 and to the second mold half 68 in order to shut off or open up a fluidic connection between the mold cavity 58 and the auxiliary cavity 60. It is self-evident that the tool 56 may have a multiplicity of mold slides 70.

FIG. 7 shows, in the sub-steps a to d, a filling process for the injection mold 56 equipped with a throttle 62. As can be seen from the figures, the material flow of a first plastics component 72 and of a second plastics component 74 can be set by means of the throttle 62 such that the profile of the flow fronts substantially follows the basic shape of the mold cavity 58. By means of the throttle 62, it is possible in this way to realize a fully areal form of a wall structure with two or more layers with little material usage.

Figure 8A:
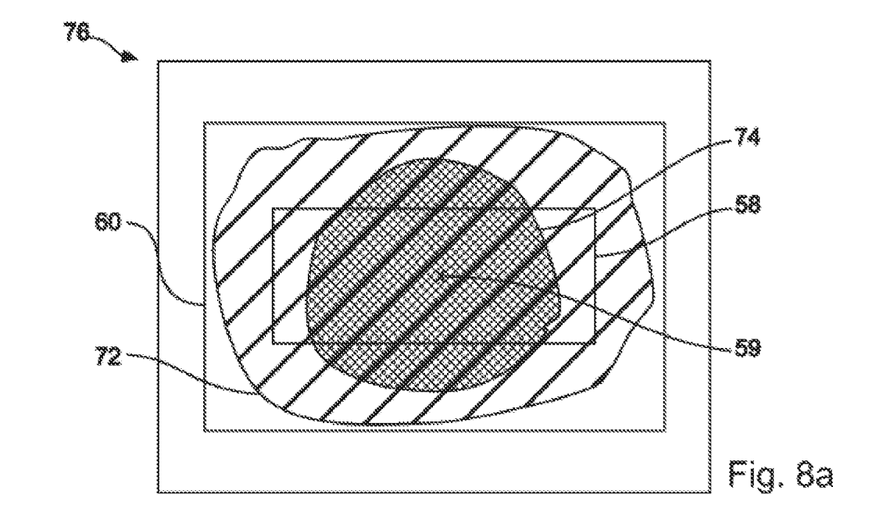
FIGS. 8a-8b show a filling process for an injection molding tool as per FIG. 5 or FIG. 2.
Figure 8B:
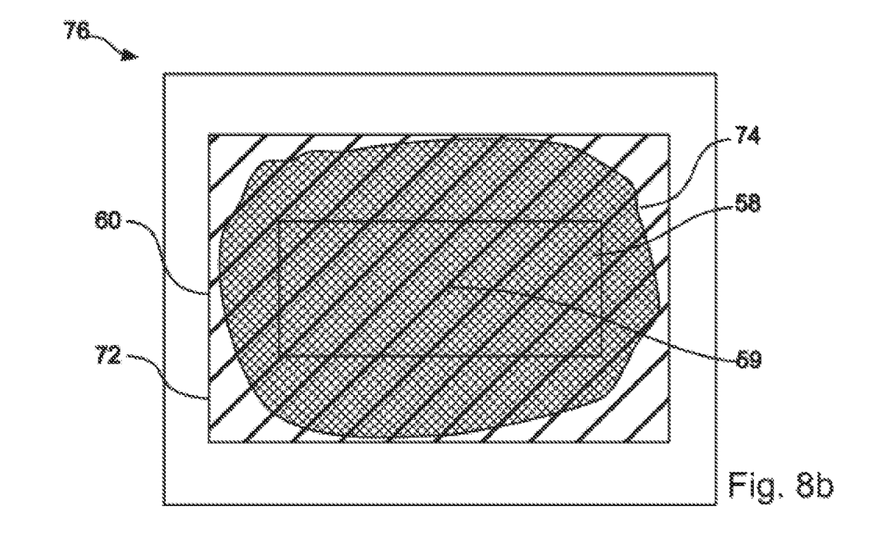

FIG. 8 shows, by way of example, the filling process for an injection molding tool 76 without a throttle as illustrated, for example, in FIGS. 1 and 5. In this case, too, it is possible to realize fully areal layer formation of a first plastics component 72 with a second plastics component 74 over the entire mold cavity 58. As can be seen in FIGS. 8a and 8b, the materials 72, 74 however propagate over a much larger area in the region of the auxiliary cavity 60, and follow the outline of the mold cavity 58 less exactly.

Throttle 62, mold slide 70 and/or auxiliary cavity 60 may be provided in separate mold inserts.

REFERENCE DESIGNATIONS

2 Liquid container, fuel tank
4 Half-shell, first shell
6 Half-shell, second shell
8 Barrier layer
10 Inner surface layer
12 Outer surface layer
14 Cavity volume
16 Injection molding machine
18 Injection molding tool
20 Mold cavity
22 Mold wall of the first mold half
24 Mold wall of the second mold half
26 First mold half
26a Main body
26b Mold insert
28 Second mold half
28a Mold insert
28b Main body
30 Auxiliary cavity
32 Gate region
34 Edge region of the mold cavity
36 Excess injection molding material
38 First plastics component
40 Second plastics component
42 Interface
44 Surface layer
46 Adhesion promoter
48 Barrier layer
50 Auxiliary wall
52 Melting and conveying unit
54 First mold half
56 Injection molding tool/Injection mold
58 Mold cavity
59 Gate/Gate region
60 Auxiliary cavity
62 Throttle
64 Mold wall
66 Mold wall 68 Second mold half
70 Mold insert
72 First plastics component
74 Second plastics component
76 Injection molding tool/Injection mold
E Plane
S Section plane
t Wall thickness of the shells 4, 6

The invention claimed is:

1. A method for producing a liquid container (2) for a motor vehicle, which liquid container is assembled from at least two shells (4, 6), comprising:
   providing an injection molding machine (16),
      having an injection molding tool (18, 56, 76),
      wherein the injection molding tool (18, 56, 76) has at least one mold cavity (20, 58) which is configured for replicating the geometry of a first shell (4) of the liquid container (2) and which is formed between mold walls (22, 24, 64, 66) of at least one first and one second mold half (26, 26a, 26b, 28, 28a, 28b, 54, 68) of the injection molding tool (18, 56, 76),
      wherein the injection molding tool (18, 56, 76) has at least one auxiliary cavity (30, 60),
      wherein the auxiliary cavity (30, 60) is fluidically connected to the mold cavity (20, 58),
      wherein the auxiliary cavity (30, 60) adjoins the mold cavity (20, 58) at least in certain portions in an edge region (34), spaced apart from a gate region (32, 59), of the mold cavity (20, 58),
      wherein the auxiliary cavity (30, 60) is configured for receiving excess injection molding material (36), and
      wherein the mold cavity (20, 58) is, as viewed in a cross section, circumferentially completely enclosed by the auxiliary cavity (30, 60);
   producing the first shell (4) by plasticizing and injecting molding material of a first plastics component (38, 44, 72) and molding material of a second plastics component (40, 46, 48, 74) into the mold cavity (20, 58),
      such that the first and the second plastics component (38, 40, 44, 46, 48, 72, 74) are connected to one another along an interface and that
      the first plastics component (38, 44, 72) lies against a mold wall (22, 66) of the first mold half (26, 54), and the second plastics component (40, 46, 48, 74) and the interface (42) are spaced apart from the mold wall (22, 66) of the first mold half (26, 54),
      wherein at least a part of the auxiliary cavity (30, 60) is filled with excess injection molding material (36) of the first and second plastics component (38, 40, 44, 46, 48, 72, 74);
   producing a second shell (6) of the liquid container (2);
   connecting the first and second shell (4, 6); and
   removing the excess material (36) of the first and second plastics component (38, 40, 44, 46, 48, 72, 74), wherein the removal of the excess material (36) is performed before or after the connection of the shells (4, 6).

2. The method as claimed in claim 1,
   wherein the provided injection molding machine (16) is configured for multi-component sandwich injection molding,
   wherein the first and second plastics component (38, 40, 44, 46, 48, 72, 74) are introduced in the multi-component sandwich injection molding process into the mold cavity (20, 58) and the auxiliary cavity (30, 60),
   wherein the injection of the first plastics component (38, 44, 72) into the mold cavity (20, 58) begins at a time before the injection of the second plastics component (40, 46, 48, 74), and
   wherein the second plastics component (40, 46, 48, 74) is injected as a core layer into the first plastics component (38, 44, 72), such that the first plastics component (38, 44, 72) encloses the core layer (40, 46, 48, 74).

3. The method as claimed in claim 2,
   wherein at least three plastics components (38, 40, 44, 46, 48, 72, 74) are injected one into the other in the multi-component sandwich injection molding process, in particular a surface layer (38, 44, 72), an adhesion promoter (46) and a core layer (40, 48, 74).

4. The method as claimed in claim 1,
   wherein a mold half (26, 28) is assembled in at least two parts from a main body (26a, 28a) and a mold insert (26b, 28b), and
   wherein, in particular, the mold wall (22, 24) of the mold cavity (20) is assigned to the main body (26a, 28a) and an auxiliary wall (50) of the auxiliary cavity (30) is assigned to the mold insert (26b, 28b).

5. The method as claimed in claim 1,
   wherein the mold cavity (20, 58) is, as viewed in a cross section, circumferentially completely enclosed by the auxiliary cavity (30, 60).

6. The method as claimed in claim 1,
   wherein the first plastics component (38, 44, 72), during the injection into the mold cavity (20, 58), has a lower viscosity than the second plastics component (40, 46, 48, 74).

7. The method as claimed in claim 1,
   wherein the first plastics component (38, 72) is a polyamide (PA), a polyphenylene sulfide (PPS), a polyoxymethylene (POM) or a polyphthalamide (PPA), and
   wherein the second plastics component (40, 74) is a polyphthalamide (PPA), a polyamide (PA), a polyoxymethylene (POM), a polyphenylene sulfide (PPS), liquid-crystal polymer (LCP), polyketone (PK) or an ethylene vinyl alcohol copolymer (EVOH),
   and/or
   wherein at least one plastics component is a fiber-reinforced plastic.

8. The method as claimed in claim 3,
   wherein the first plastics component (40, 72) is a high-density polyethylene (HDPE),
   wherein the second plastics component (46, 74) is an adhesion promoter, and
   wherein the third plastics component (48) is an ethylene vinyl alcohol copolymer (EVOH).

9. The method as claimed in claim 8,
   wherein the first plastics component (40, 72), during the injection into the mold cavity (20, 58), has a lower viscosity than the second plastics component (46, 74), and
   wherein the third plastics component (48), during the injection into the mold cavity (20, 58), has substantially the viscosity of the second plastics component (46, 74).

10. The method as claimed in claim 1,
    wherein, before or after the connection of the shells (4, 6), one or more functional units such as pump, fill level sensor, valve, connector plate, connection element or the like are fastened to the first shell (4) and/or to the second shell (6).

11. The method as claimed in claim 1,
wherein the injection molding tool (18, 56, 76) has a throttle (62) which is configured for regulating a melt flow from the mold cavity (20, 58) to the auxiliary cavity (30, 60).

12. The method as claimed in claim 11,
wherein the throttle (62) is formed by a constriction of a mold cross section.

13. The method as claimed in claim 1,
wherein mold slides (70) are configured for opening up and closing off the auxiliary cavity (30, 60), having the method steps:
partially or completely closing off the fluidic connection between the mold cavity (20, 58) and the auxiliary cavity (30, 60) by means of the mold slides (70), in particular before the injection of the first plastics component (38, 44, 72) and/or of the second plastics component (40, 46, 48, 74); and
partially or completely opening up the fluidic connection between the mold cavity and the auxiliary cavity, in particular after the injection of the first plastics component (38, 44, 72) and/or of the second plastics component (40, 46, 48, 74).

14. An injection molding tool for producing a liquid container for a motor vehicle, comprising,
at least one mold cavity (20, 58) which is configured for replicating the geometry of a first shell (4) and/or of a second shell (6) of the liquid container (2) and which is formed between mold walls (22, 24) of at least one first and one second mold half (26, 26a, 26b, 28, 28a, 28b, 54, 68) of the injection molding tool (18, 56, 76),
wherein the injection molding tool (18, 56, 76) has at least one auxiliary cavity (30, 60),
wherein the auxiliary cavity (30, 60) is fluidically connected to the mold cavity (20, 58),
wherein the auxiliary cavity (30, 60) adjoins the mold cavity (20, 58) at least in certain portions in an edge region (34), spaced apart from a gate region (32, 59), of the mold cavity (20, 58), and
wherein the auxiliary cavity (30, 60) is configured for receiving excess injection molding material (36), characterized in that
the mold cavity (20, 58) is, as viewed in a cross section, circumferentially completely enclosed by the auxiliary cavity (30, 60).

15. The injection molding tool as claimed in claim 14,
wherein the injection molding tool (18, 56, 76) has a throttle (62) which is configured for regulating a melt flow from the mold cavity (20, 58) to the auxiliary cavity (30, 60).

16. The injection molding tool as claimed in claim 14,
wherein the throttle (62) is formed by a constriction of the mold cross section, and/or
wherein the throttle (62) is segmented for the purposes of locally regulating the melt flow, and/or
wherein the throttle (62), as viewed in a cross section, completely encloses the mold cavity.

17. The injection molding tool as claimed in claim 14,
wherein one or more mold slides (70) are configured for opening up and closing off the auxiliary mold cavity (30, 60), and
wherein the mold slides (70) are arranged in particular on a first and/or a second mold half (26, 26a, 26b, 28, 28a, 28b, 54, 68) of the injection molding tool (18, 56, 76).

* * * * *